United States Patent
Berreman

[11] 4,033,671
[45] July 5, 1977

[54] LIQUID CRYSTAL TWIST CELLS

[75] Inventor: Dwight Winton Berreman, Westfield, N.J.

[73] Assignee: Bell Telephone Laboratories, Incorporated, Murray Hill, N.J.

[22] Filed: Sept. 26, 1975

[21] Appl. No.: 617,073

[52] U.S. Cl. .................................. 350/160 LC
[51] Int. Cl.² ................................. G02F 1/16
[58] Field of Search ....................... 350/160 LC

[56] References Cited
OTHER PUBLICATIONS

Gooch, C. H., Tarry H. A., "Optical Characteristics of Twisted Nematic Liquid-Crystal Films" Elec. Lett., vol. 10, No. 1, Jan. 10, 1974, pp. 2-4.
Soref, R. A., "Transverse Field Effects in Nematic Liquid Crystals" Appl. Phys. Lett., vol. 22, No. 4, Feb. 15, 1973, pp. 165-166.
Raynes, E. P. "Improved Contrast Uniformity in Twisted Nematic Liquid—Crytal Electrooptic Display Devices" Elec. Lett. May 2, 1974, vol. 10, No. 9.

Primary Examiner—John K. Corbin
Assistant Examiner—Rolf Hille
Attorney, Agent, or Firm—Peter V. D. Wilde

[57] ABSTRACT

An improved liquid crystal twist cell with significant reduction in the undesirable "optical bounce" and off axis interference phenomena is described.

6 Claims, 3 Drawing Figures

LIQUID CRYSTAL TWIST CELLS

BACKGROUND OF THE INVENTION

1. Field of the Invention

This invention relates to liquid crystal twist cells.

2. Description of the Prior Art

Liquid crystal devices have been the subject of intensive technological development for a number of years. Such devices may be utilized in optical memory units, display devices, or switches and require only small amounts of power for efficient operation. The liquid crystal devices fall into three distinct categories, depending upon their specific mode of operation, In the "dynamic scattering devices" the transmission characteristics of the liquid crystal are altered by causing an ion current to flow through the crystalline material. The turbulence which is generated by this current flow is sufficient to render the otherwise transparent liquid opaque.

In a second class of devices the liquid crystal is mixed with an appropriate dye which is characterized by an anisotropic absorption coefficient. In this configuration the liquid crystal is used as a host which may be aligned by means of an electric field. The alignment of the liquid crystal host alters the alignment of characteristics of the anisotropically absorbing dye. This alteration in the alignment of the dye affects its absorbing characteristics and hence alters the transmission properties of the device.

A third type of liquid crystal device—the twist cell—was first described by Schadt and Helfrich in Volume 18 of the *Applied Physics Letters* at page 127. Unlike the prior devices, the twist cell operates by rotating the direction of polarization of an incoming electro-magnetic wave.

In the twist cell a liquid crystal is sandwiched between two plane surfaces, with the liquid crystal molecules oriented approximately parallel to the surfaces. The molecules, although arranged in such a planar configuration, are still free to point in any given direction in the plane parallel to the surface. In a twist cell the distribution of directions of the individual molecules is made to continuously change from one surface to the other. In this manner a configuration of molecular orientations is formed which may be visualized as similar to the steps of a ladder which has been twisted into a helix about an axis which runs through the center of the steps. In this heuristic picture the steps represent the individual molecules. In a Schadt and Helfrich twist cell the total molecular rotation from one surface to another is about 90 degrees, and hence these devices are sometimes referred to as "quarter-turn twist cells."

According to a well-known optical principle, light entering the crystal, polarized in the plane of the liquid crystal molecules near the entering surface, and either parallel or perpendicular to the molecules, has its direction of polarization rotated as it traverses the crystal. The amount of rotation is equivalent to the amount of molecular twist.

If an electric field is applied to the crystal and is caused to point from one surface to the other, then the molecules in the central region of the cell will be aligned approximately parallel to the electric field rather than approximately parallel to the liquid crystal boundary surfaces. Such molecules will be approximately perpendicular to their previous "field off" position. In such a configuration light entering the crystal as before will not have its direction of polarization rotated and hence will traverse the liquid crystal unaffected.

It is apparent that if a polarizer is placed at the exit of a twist cell and is aligned parallel to the cell surface, but with its polarizing direction perpendicular to the alignment of the molecules closest to the exit surfaces, the light will only be transmitted through the polarizer when the field is on. This may be understood by considering that when the field is off, the polarizing direction of the polarizer is aligned to accept light whose initial polarization direction would not permit passage through the polarizer, but whose rotation by the twist cell permits such passage. However, when the field is on, the direction of polarization of the incoming light is not altered as it traverses the cell. Consequently, the light exits the crystal polarized in the same direction as when it entered the cell. Since the polarizing direction of the polarizer is aligned in this direction, the light will be transmitted through this polarizer. A reflecting surface placed beyond the polarizer will cause the light to be reflected back through the cell for viewing purposes. If the polarizer is rotated by 90 degrees the cell will be "off" when the field is on, as opposed to the above mode of operation.

While the above device is exceedingly attractive for use as an optical switch, a memory unit, or a display device, two phenomena limit its application.

Firstly, it is found that when the field is turned off, the transmission characteristics of the cell do not change monotonically but rather display an oscillatory behavior known as "optical bounce." A certain amount of this effect is due to a nonuniform relaxation phenomenon known as "backflow" whose effect may be reduced by the addition of some cholesteric, or naturally twisted liquid crystal.

A second limiting effect appears when the impinging light is not viewed from a perpendicular direction. In such a case, the birefringence of the liquid crystal material gives rise to an interference phenomenon. This results in a display with significant nonuniformity in intensity depending on the direction from which the display is viewed, and in an optical flicker or bounce when the device is turned on or off.

SUMMARY OF THE INVENTION

I have analyzed the optical properties of liquid crystal twist cells as well as studied the dependence of these optical properties on the molecular orientation at the two plane surfaces; the thickness of the liquid crystal layer; the electric or magnetic field applied across the liquid crystal; the dielectric or magnetic anisotropy of the liquid crystal; the direction and wavelenth of the incident light; the optical anisotropy of the liquid crystal; and the three elastic and five viscous parameters associated with the liquid crystal. As a result of these studies, an improved quarter-turn liquid crystal twist cell may be fabricated in which the optical bounce and interference effects are minimized. In such a cell the relationship between the index of refraction of the liquid crystal, and the thickness of the cell and the wavelength of the incident light must be maintained within specific ranges.

DETAILED DESCRIPTION

Figure 1:
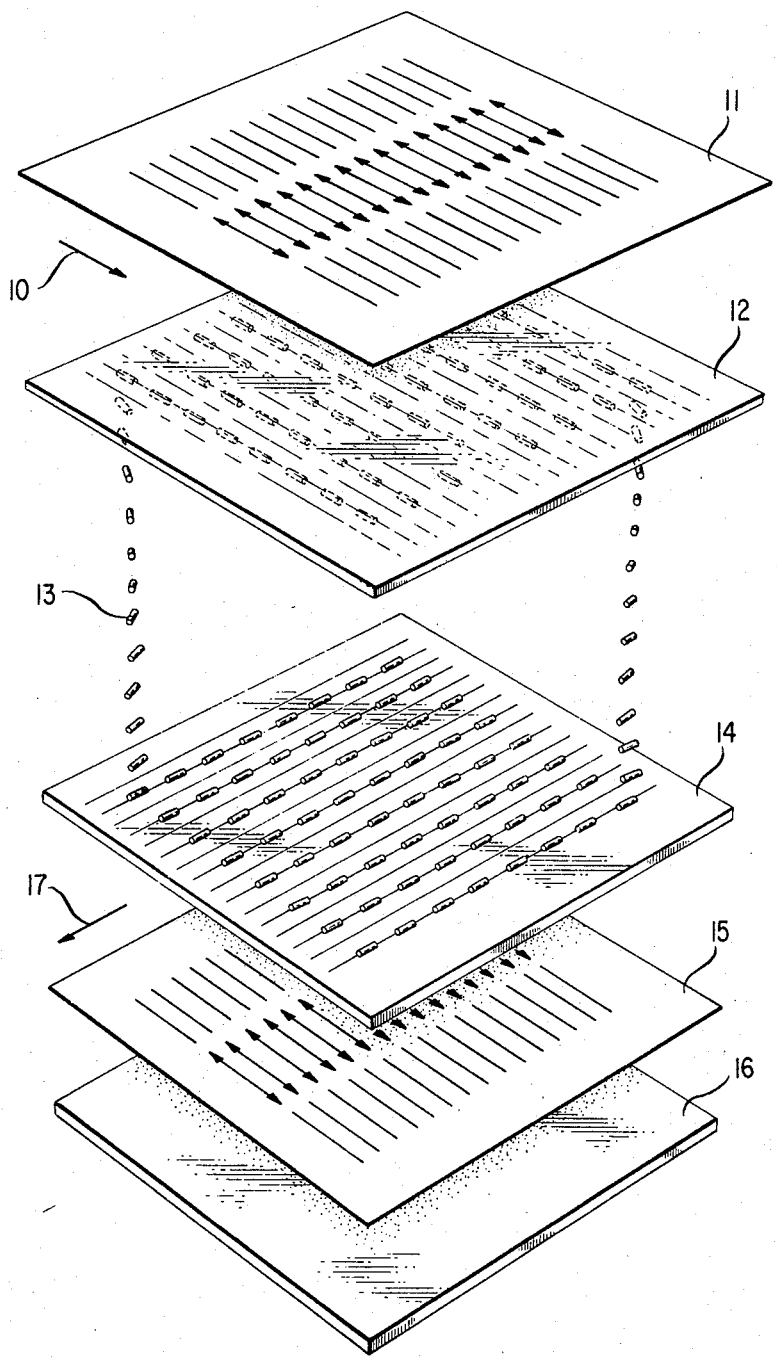
FIG. 1 is a representation of a liquid crystal quarter turn twist cell in the absence of any external alignment means.

In FIG. 1 the elements of a liquid crystal quarter turn twist cell are displayed. The particular device shown has additional elements which allow it to be used as an ambient light display device. Such a device requires no internal light source for the operation but rather reflects ambient light. In FIG. 1 no external alignment means is being applied and the device, as shown, is in a nonreflecting mode.

A quarter turn twist cell requires polarized incident light for its proper operation. For applications which utilize ambient unpolarized light, a polarizer, 11, is needed. In this manner the light entering the first cell surface, 12, is polarized parallel to the directed irregularities of this surface. The polarizer may alternatively be aligned at right angles to the irregularities with concomitant alterations in the alignment of other elements, when necessary. The irregularities are on the inner surface of 12, which is exposed to, and consequently orients, the molecules of the liquid crystal, 13.

The orienting surface 12 may be of any material transparent to the light being utilized. This light is usually in the optical range from 4500 Angstroms to 7500 Angstroms. The material 12, or a surface applied to it, must be conducive to any one of several treatments which enable it to orient the liquid crystal molecules adjacent to the surface. Such treatments include etching or grooving the surface, and are further discussed in my U.S. Pat. No. 3,787,110. As will be discussed in the description of FIG. 2, the cell also requires an external alignment means, usually in the form of an electric or magnetic field, applied to the cell. To facilitate the application of such a field, the surface 12 may be coated with a transparent conducting material to which a voltage may be applied in order to establish the field.

The liquid crystal material 13 is located between the surface 12 and an essentially similar surface 14. However, while the surface 14 is parallel to the surface 12, its directed structures are oriented approximately perpendicular to those of the surface 12.

As the orientation angle changes from 90° the contrast ratio of the device decreases. It is consequently preferable that the orientation be within 5° of 90°. Since the molecules nearest the surfaces orient themselves parallel to the directional structures of these surfaces, the intermolecular forces tend to result in a twisted crystal configuration when the surfaces are oriented as in FIG. 1. The twisted configuration of the liquid crystal molecules 13 is shown in FIG. 1.

As discussed in the section on prior art, light polarized in the direction shown by the arrow 10 tends to have its direction of polarization rotated by the twist of the liquid crystal molecules. After traversing the liquid crystal, the light is polarized in the direction shown by the arrow 17 and passes through the surface 14. In order to effectively rotate the direction of polarization of the light, the thickness of the liquid crystal layer must be at least twice the wavelength of the light.

A polarization analyzer 15, if aligned as shown in FIG. 1, will prevent the further transmission of the light 17. The surface 16, capable of reflecting light at the operating wavelength will be ineffective in that no light will reach it. In this configuration the device is normally off. The polarizer in an alternative configuration may be aligned to pass light of polarization represented by 17 in which case the device will be normally on. For the purposes of the following discussion, however, we will assume the configuration shown in FIG. 1.

Figure 2:
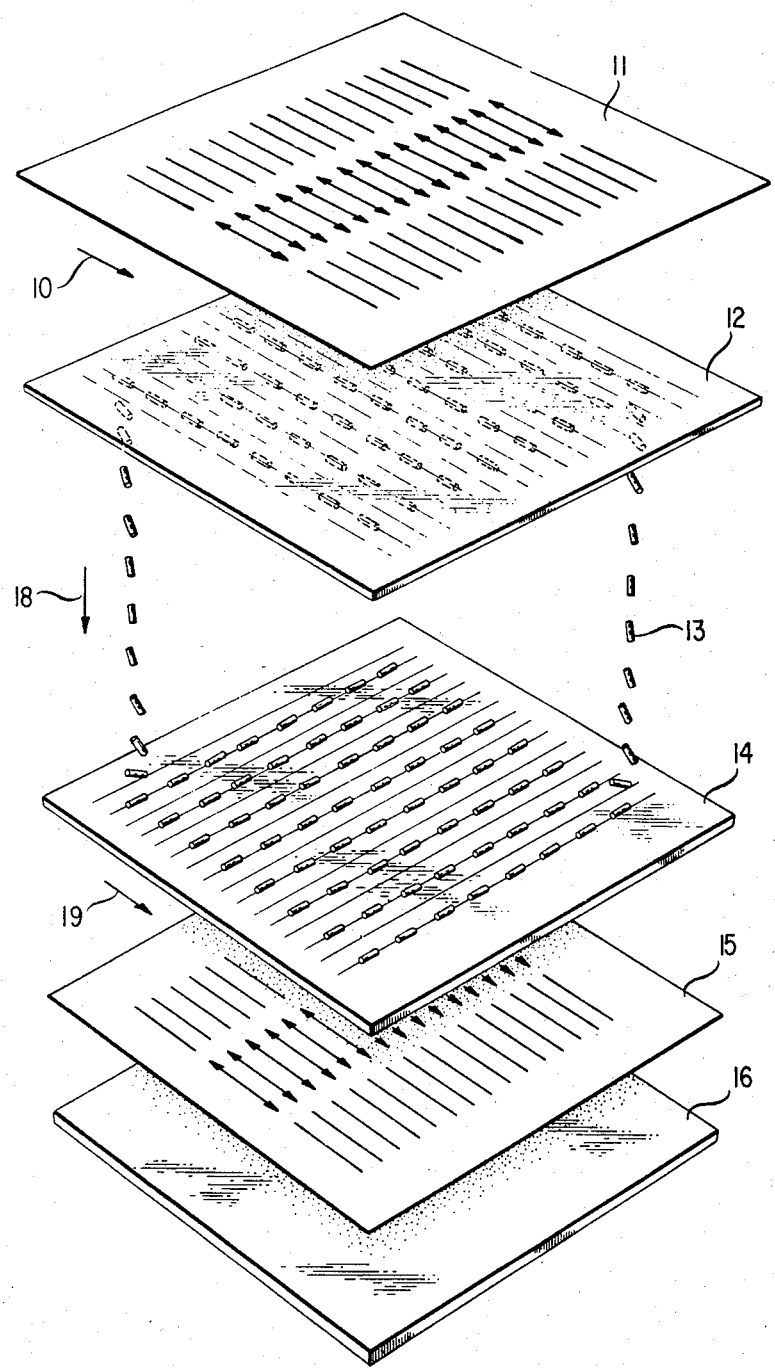
FIG. 2 is a representation of a liquid crystal quarter turn twist cell with an alignment means applied to orient the liquid crystal molecules in a direction perpendicular to the cell surface.

With the device in the normally off configuration, an external means is required which will enable the device to be turned on which desired. It is found that an electric or magnetic field may serve this purpose. The device of FIG. 1 is reproduced in FIG. 2 with the additional field represented by the arrow 18. The means for producing this field may be external to the device or may be in the form of conducting surfaces on the layers 12 and 14 as mentioned above. An appropriate voltage, for example, applied to such conducting surfaces would support the necessary field. An A.C. voltage is preferable insofar as it does not produce crystal degrading ion currents. If the liquid crystal is of positive dielectric anisotropy the liquid crystal molecules will align under the influence of the field as shown in FIG. 2. In such a configuration the molecules are ineffective in rotating the direction of polarization of the incident light 10, and such light will leave the crystal material in the orientation shown by the arrow 19. This is the critical effect of the field 18, insofar as in this configuration the light is now transmitted by the polarizer 15 and reflected back through the cell by the surface 16. To the viewer the device then appears "on." Numerous such devices may be fabricated in an array capable of alphanumeric display.

When the field in FIG. 2 is turned off the molecules do not relax to the configuration of FIG. 1 monotonically. As a result of this "backflow" effect the viewer observes an "optical bounce." It has been found that the addition of a slight amount of cholesteric crystal which is in a naturally "twisted" state alleviates this aspect of the problem.

A more serious "bounce" effect appears when the incident light is not perpendicular to the surface but is rather skewed. In such a circumstance the incident light may be considered to consist of two components, one "ordinary" and one "extraordinary," each of which traverses the crystal at a different velocity. The different components interfere with one another and the viewer observes a pattern similar to the one shown in FIG. 3. The pattern carries with it two drawbacks. Firstly, the display device does not present a uniformly illuminated field—aesthetically and operationally disturbing. Secondly, the minima and maxima traverse the viewing direction when the device is turned on or off. This appears as an optical flicker and hence is a second cause of "optical bounce."

In investigating these phenomena I have performed an exhaustive study of the interrelationships between the various parameters affecting the operation of liquid crystal quarter turn twist cells. These parameters include the alignment of the orienting surfaces, the thickness of the liquid crystal layer, the magnitude of the electric (or magnetic) field applied across the liquid crystal, the degree of the electric (or magnetic) anisotropy of the liquid crystal, the wavelength and direction of the incident light, the optical anisotropy of the liquid crystal and its three elastic and five viscous parameters. I have associated the optical bounce and nonuniform illumination with the interference phenomenon discussed above and displayed in FIG. 3. I have determined an operating range over which this interference is significantly reduced. The range involves a complex inter-relationship between the indices of refraction associated with the ordinary and extraordinary components, $n_o$ and $n_e$, the vacuum wavelength of the light $\lambda_v$, and the thickness of the liquid crystal layer $T$. The desirable operating range is given by the expression $$\frac{1}{4} \leq \frac{T}{\lambda_v} \left| \frac{n_o^2}{\sqrt{n_o^2 - 1}} - \frac{n_e^2}{\sqrt{n_e^2 - 1}} \right| \leq 1. \quad (1)$$

Figure 3:
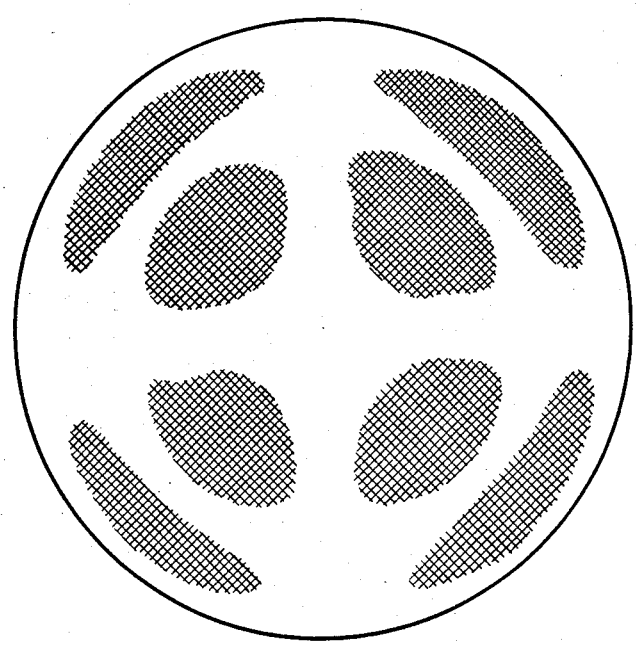
FIG. 3 is a representation of the angular interference pattern which is generated when a broad cone of light enters the cell.

Over this range the central illuminated region of the interference pattern shown in FIG. 3 dominates the display. The viewing field is then more uniformly illuminated and the dominating optical bounce associated with the interference pattern is minimized. A narrower operating range more desirable for certain applications is given by the expression $$\frac{1}{4} \leq \frac{T}{\lambda_v} \left| \frac{n_o^2}{\sqrt{n_o^2 - 1}} - \frac{n_e^2}{\sqrt{n_e^2 - 1}} \right| \leq \frac{1}{2}. \quad (2)$$

In both equations 1 and 2 the upper range value limits the optical path difference that may be generated between the different limit components as they traverse the crystal. In equation 1 this is limited to one wavelength, while in equation 2 it is limited to one-half wavelength. Further reductions in this limit will result in additional, although increasingly smaller, improvements. The lower range value is determined by the requirement that the molecular twist effect be gradual enough to alter the direction of polarization of the incident light.

Equations 1 or 2 may be satisfied by varying any one of the parameters contained in the equations. The indices of refraction of the material may be altered by changing the external operating conditions. In addition specific liquid crystals may be engineered, or mixtures may be used, which display preferred values of refractive index. For example combinations of cholesterics such as cholesterol nonanoate, chloride and acetate in such compensating proportions so as to yield a long pitch, will have desirable values of refractive index.

The device illustrated in FIGS. 1 and 2 includes a reflective surface for display purposes. However the interference problem, and its solution, apply to the simple transmission device, without the reflective surface, as well, and the practice of this invention will significantly improve the operation of such devices. Furthermore, for the purposes of illustration a quarter turn twist cell has been discussed. However a twist cell with some other angle of twist may be equally effective. For example, the 90° orientation of the grooved structures would allow for a three-quarter turn or higher order turn twist cell.

EXAMPLE 1

The parameters constituting a preferred embodiment may be confidently stated on the basis of both the laboratory experiments and computer simulations performed by the applicant. In such an embodiment the orienting surfaces represented in FIGS. 1 and 2 by 12 and 14 are square pieces of glass, 1 centimeter on each side. A layer of tin oxide, applied to these surfaces, is used to produce an electric field by means of an appropriate alternating voltage. As discussed before, an alternating field eliminates the destructive effects that the passage of a current, associated with a static field, has upon the liquid crystal. A layer of silicon oxide is then evaporated onto the tin oxide surface from an angle of 5° relative to the surface. Such an evaporation process results in the appearance of directed groove structures separated by approximately 100 Angstroms in the shadow direction of the evaporation. It is found that such a structure imparts an approximate initial 5 degree orientation relative to the surface to the molecules closest to the grooved surface, thereby increasing the field's efficiency in flipping the molecular direction to the direction shown in FIG. 2.

In this embodiment the liquid crystal is (N - (p-methoxybenzylidene) - p-butylaniline), commonly referred to as MBBA, doped with 2 percent by weight dimethylaminobenzonitrile in order to yield a liquid crystal with positive dielectric anisotropy. The device is operated at room temperature and under these conditions, $n_e$ is 1.74 and $n_o$ is 1.56. For the purposes of this example the incident wavelength is taken to be 0.5 microns in order to approximate common ambient light. According to the preferred range of Equation 2 the thickness of the cell is between 1.3 and 2.7 microns. The polarizer is commercially available POLAROID® polarizing filter and is oriented as shown in the Figure. The reflective surface is a simple silvered mirror. The device constructed according to this example displaces minimal interference and optical bounce phenomena.

What is claimed is:

1. A liquid crystal twist cell device with improved interference and optical bounce properties capable of operating at a wavelength $\lambda_v$ comprising:

a first surface capable of transmitting optical radiation of wavelength $\lambda_v$, and capable of inducing alignment of the liquid crystal molecules in contact with the said surface;

a layer of liquid crystal material of positive dielectric anisotropy;

a second surface capable of transmitting optical radiation of wavelength $\lambda_v$, and capable of inducing alignment of liquid crystal molecules in contact with the said second surface, the two said surfaces bounding the liquid crystal, said second surface aligned parallel to said first surface but oriented so as to align the said molecules in contact with it at an angle of approximately 90° relative to the molecules in contact with said first surface, but in a plane parallel to said molecules in contact with said first surface;

a polarization analyzer adjacent and approximately parallel to one of said surfaces;

means to align the liquid crystal molecules perpendicular to the plane of said surfaces;

the invention characterized in that the relationship between the thickness $T$ of the liquid crystal layer its ordinary index of refraction $n_o$ and its extraordinary index of refraction $n_e$ and the wavelength of the incident light $\lambda_v$ is given by $$\frac{1}{4} \leq \frac{T}{\lambda_v} \left| \frac{n_o^2}{\sqrt{n_o^2 - 1}} - \frac{n_e^2}{\sqrt{n_e^2 - 1}} \right| \leq 1.$$

2. The device of claim 1 wherein both the first surface and the second surface are bounded by the liquid crystal on one side and by a polarization analyzer on the other side.

3. The device of claim 1 wherein the means to align the liquid crystal molecules perpendicular to the plane of the said surfaces comprises an electric field applied to the liquid crystal.

4. The device of claim 1 wherein the first and second surfaces are endowed with grooved structures thereby making them capable of inducing alignment of the liquid crystal molecules in contact with the said surfaces.

5. The device of claim 1 wherein the wavelength $\lambda_v$ is between 4500 A. and 7500 Angstroms.

6. The device of claim 1 wherein the relationship between the thickness $T$ of the liquid crystal layer, its ordinary index of refraction $n_o$, its extraordinary index of refraction $n_e$ and the wavelength of the incident light $\lambda_v$ is given by $$\frac{1}{4} \leq \frac{T}{\lambda_v} \left| \frac{n_e^2}{\sqrt{n_e^2-1}} - \frac{n_o^2}{\sqrt{n_o^2-1}} \right| \leq \frac{1}{2}.$$

* * * * *